(12) United States Patent
Igarashi

(10) Patent No.: US 11,978,068 B2
(45) Date of Patent: May 7, 2024

(54) CUSTOMER INFORMATION REGISTRATION APPARATUS

(71) Applicant: NEC Corporation, Tokyo (JP)

(72) Inventor: Makoto Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 17/278,743

(22) PCT Filed: Aug. 28, 2019

(86) PCT No.: PCT/JP2019/033745
§ 371 (c)(1),
(2) Date: Mar. 23, 2021

(87) PCT Pub. No.: WO2020/066443
PCT Pub. Date: Apr. 2, 2020

(65) Prior Publication Data
US 2022/0036379 A1   Feb. 3, 2022

(30) Foreign Application Priority Data

Sep. 26, 2018  (JP) .................................. 2018-180212

(51) Int. Cl.
*G06Q 30/0201* (2023.01)
*G06F 16/51* (2019.01)

(52) U.S. Cl.
CPC ......... *G06Q 30/0201* (2013.01); *G06F 16/51* (2019.01)

(58) Field of Classification Search
None
See application file for complete search history.

(56) References Cited

U.S. PATENT DOCUMENTS

| | | | | |
|---|---|---|---|---|
| 2002/0010622 A1* | 1/2002 | Okamoto | ........... | G06Q 30/0204 705/7.29 |
| 2005/0254505 A1* | 11/2005 | Chang | ..................... | H04L 67/12 370/401 |
| 2011/0196745 A1* | 8/2011 | Moriya | ............ | H04N 21/41415 705/14.67 |
| 2011/0199486 A1* | 8/2011 | Moriya | .................. | G06Q 30/02 348/150 |

(Continued)

FOREIGN PATENT DOCUMENTS

| | | | |
|---|---|---|---|
| CN | 107729419 A | * | 2/2018 |
| JP | 2001-325643 A | | 11/2001 |

(Continued)

OTHER PUBLICATIONS

International Search Report for PCT Application No. PCT/JP2019/033745, dated Nov. 26, 2019.

(Continued)

*Primary Examiner* — Susanna M. Diaz

(57) ABSTRACT

A matching unit configured to match face data of a customer based on image data acquired by a camera in a shop against face data stored in a storage unit, a behavior information acquisition unit configured to acquire behavior information according to a behavior of the customer in the shop, and a condition determination unit configured to determine whether or not to store the face data into the storage unit based on the behavior information acquired by the behavior information acquisition unit in a case where the matching fails are provided.

7 Claims, 9 Drawing Sheets

| | 243 |
|---|---|
| FEATURE VALUE OF SAME PERSON IS CALCULATED FROM IMAGE DATA ACQUIRED FROM GIVEN NUMBER OR MORE CAMERAS | 15 |
| STAY TIME OF SAME PERSON IDENTIFIED BASED ON FEATURE VALUE IS EQUAL TO OR MORE THAN GIVEN TIME | 10 |
| REACHING FOR PRODUCT IS DETECTED | 30 |
| PURCHASE OF PRODUCT IS DETECTED | 100 |
| ⋮ | ⋮ |

(56) References Cited

U.S. PATENT DOCUMENTS

| | | | | |
|---|---|---|---|---|
| 2013/0218634 A1* | 8/2013 | Hills | .................... | G06Q 30/02 |
| | | | | 705/7.29 |
| 2014/0161316 A1* | 6/2014 | Golan | ................ | G06F 16/5866 |
| | | | | 382/103 |
| 2016/0071118 A1* | 3/2016 | Chiao | ................ | G06Q 10/067 |
| | | | | 705/7.29 |
| 2017/0185869 A1* | 6/2017 | Dua | ....................... | G06F 16/58 |
| 2017/0206571 A1* | 7/2017 | Dhawan | ............ | G06Q 30/0613 |
| 2018/0061010 A1* | 3/2018 | Akselrod | .......... | H04N 21/4627 |
| 2018/0240089 A1* | 8/2018 | Okamoto | ............ | G06Q 20/065 |
| 2019/0108561 A1* | 4/2019 | Shivashankar | ........ | G06F 17/18 |
| 2019/0342491 A1* | 11/2019 | Mandavilli | ........ | G06V 40/1365 |

FOREIGN PATENT DOCUMENTS

| | | | |
|---|---|---|---|
| JP | 2004-348618 A | | 12/2004 |
| JP | 2005-250745 A | | 9/2005 |
| JP | 2008-257488 A | | 10/2008 |
| JP | 2008257488 A | * | 10/2008 |
| JP | 2009-246799 A | | 10/2009 |
| WO | 2018/042549 A1 | | 3/2018 |

OTHER PUBLICATIONS

Japanese Office Communication for JP Application No. 2020-548233 dated Oct. 25, 2022 with English Translation.

\* cited by examiner

CUSTOMER INFORMATION REGISTRATION APPARATUS

This application is a National Stage Entry of PCT/JP2019/033745 filed on Aug. 28, 2019, which claims priority from Japanese Patent Application 2018-180212 filed on Sep. 26, 2018, the contents of all of which are incorporated herein by reference, in their entirety.

TECHNICAL FIELD

The present invention relates to a customer information registration apparatus, a customer information registration method, a recording medium, a camera, and a customer information registration system.

BACKGROUND ART

For purposes such as marketing, feature value information calculated based on a face image of a customer may be registered and managed.

One of such techniques is described in, for example, Patent Document 1. In Patent Document 1, a product sales system is described which has a means for inputting product information of a product that a customer wants to purchase, a means for inputting the product information and a face image of the customer, combining, and storing as customer information, a means for identifying a sales floor where the product is sold, and a means for transmitting the customer information to a server of the sales floor. According to Patent Document 1, when a clerk finishes serving the customer, it is notified to a terminal of the clerk whether to register the customer information. Then, in a case where the clerk determines that there is a need to register, the customer information is registered.

Patent Document 1: Japanese Unexamined Patent Application Publication No. JP-A 2005-250745

According to the technique described in Patent Document 1, determination by a clerk is required at the time of registration of customer information. Therefore, there is a problem that it is troublesome and inefficient. On the other hand, if information of all persons whose customer information are not registered are registered based on only whether or not the customer information are registered, information with less usefulness such as information of a person who is shown by a camera for a very short time is also registered, for example. As a result, problems such as bloated data capacity and increase of data with low usefulness arise.

Thus, there is a problem that it is difficult to efficiently register highly useful customer information.

SUMMARY

Accordingly, an object of the present invention is to provide a customer information registration apparatus, a customer information registration method, a recording medium, a camera, and a customer information registration system which solve a problem that it is difficult to efficiently register highly useful customer information.

In order to achieve the object, a customer information registration apparatus as an aspect of the present invention includes: a matching unit configured to match face data of a customer based on image data acquired by a camera in a shop against face data stored in a storage unit; a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

Further, a customer information registration method as another aspect of the present invention is executed by a customer information registration apparatus having a storage unit, and the customer information registration method includes: matching face data of a customer based on image data acquired by a camera in a shop against face data stored in the storage unit; acquiring behavior information according to a behavior of the customer in the shop; and in a case where the matching fails, determining whether or not to store the face data into the storage unit based on the acquired behavior information.

Further a recording medium as another aspect of the present invention is a non-transitory computer-readable recording medium having a program recorded thereon, and the program includes instructions for causing a customer information registration apparatus having a storage unit to realize: a matching unit configured to match face data of a customer based on image data acquired by a camera in a shop against face data stored in the storage unit; a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

Further, a camera as another aspect of the present invention includes: a matching unit configured to match face data of a customer based on acquired image data against face data stored in a storage unit; a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

Further, a customer information registration system as another aspect of the present invention is a customer information registration system including a customer information registration apparatus and a camera, and the customer information registration apparatus includes: a matching unit configured to match face data of a customer based on image data acquired by the camera against face data stored in a storage unit; a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

With the configurations as described above, the present invention can provide a customer information registration apparatus, a customer information registration method, a recording medium, a camera, and a customer information registration system which solve the problem that it is difficult to efficiently register highly useful customer information.

EXAMPLE EMBODIMENTS

First Example Embodiment

Figure 1:
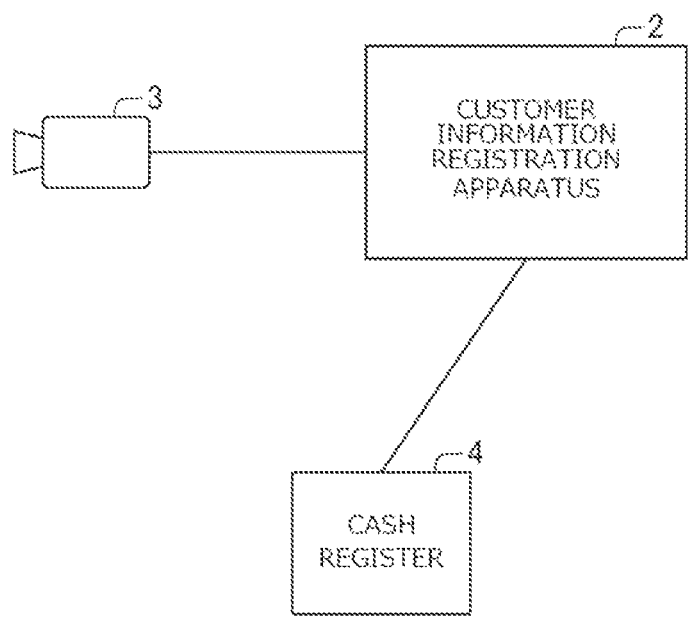
FIG. 1 is a view showing an example of an entire configuration of a customer information registration system in a first example embodiment of the present invention.
Figure 2:
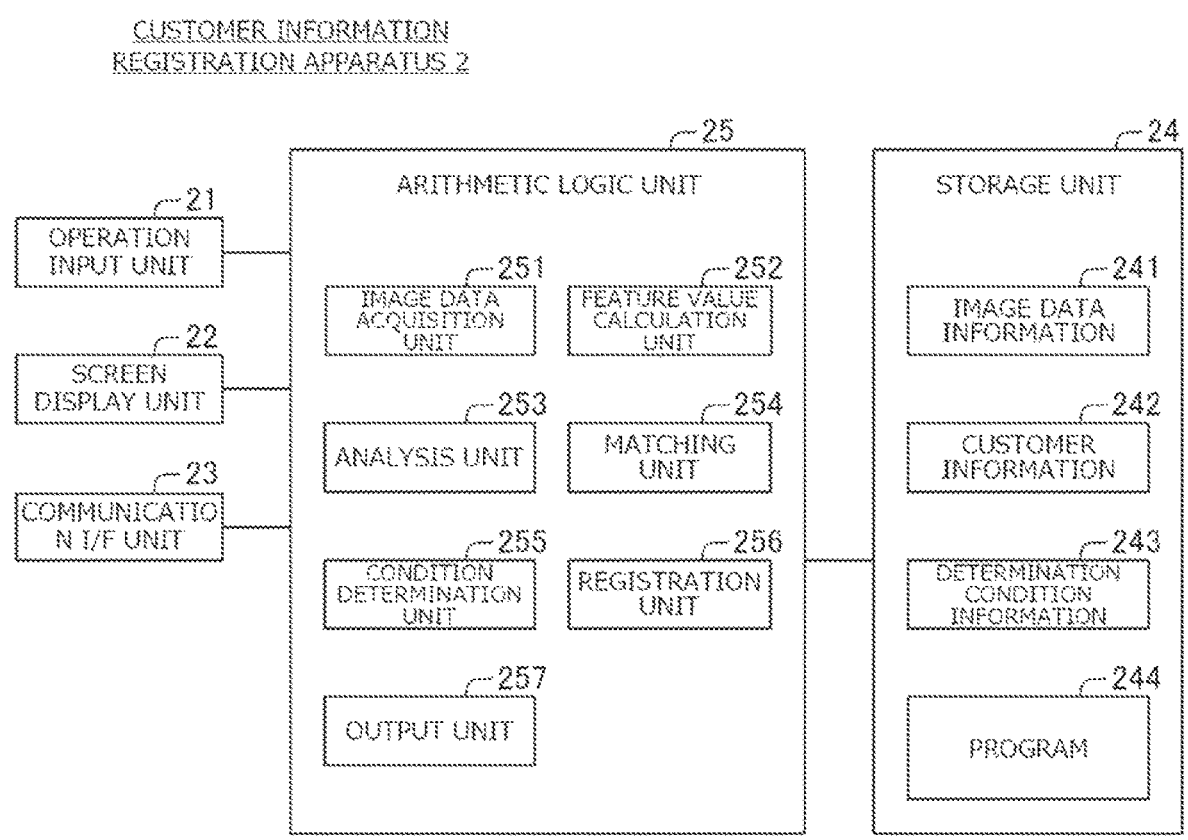
FIG. 2 is a block diagram showing an example of a configuration of a customer information registration apparatus shown in FIG. 1.
Figure 3:
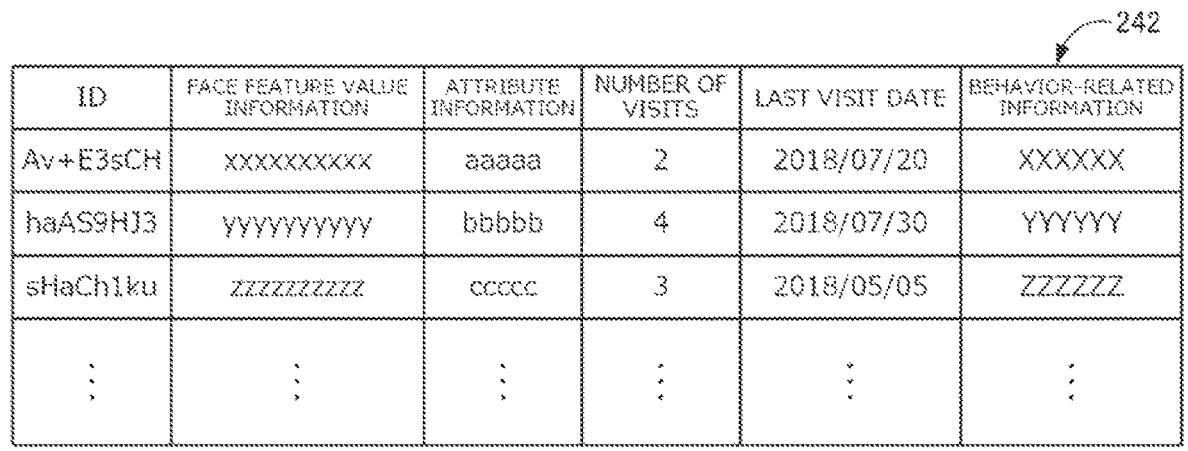
FIG. 3 is a view showing an example of customer information shown in FIG. 2.
Figure 4:
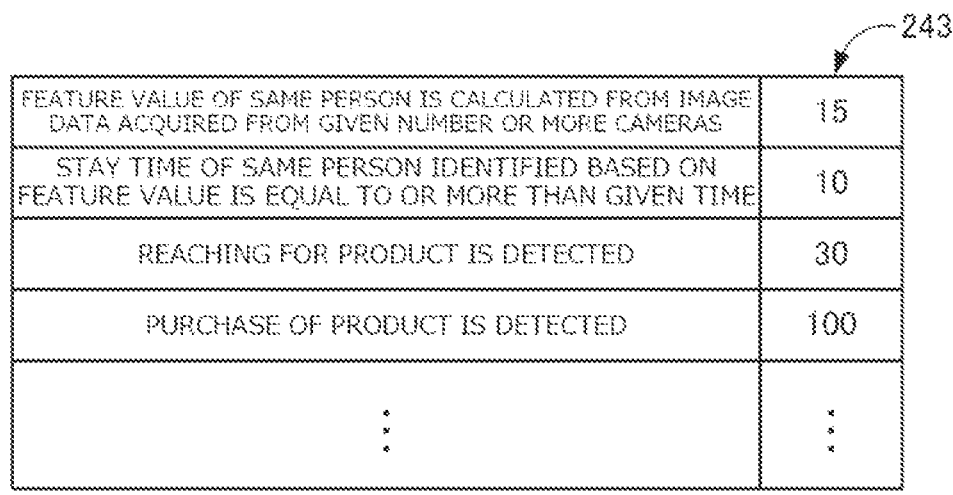
FIG. 4 is a view showing an example of determination condition information shown in FIG. 2.
Figure 5:
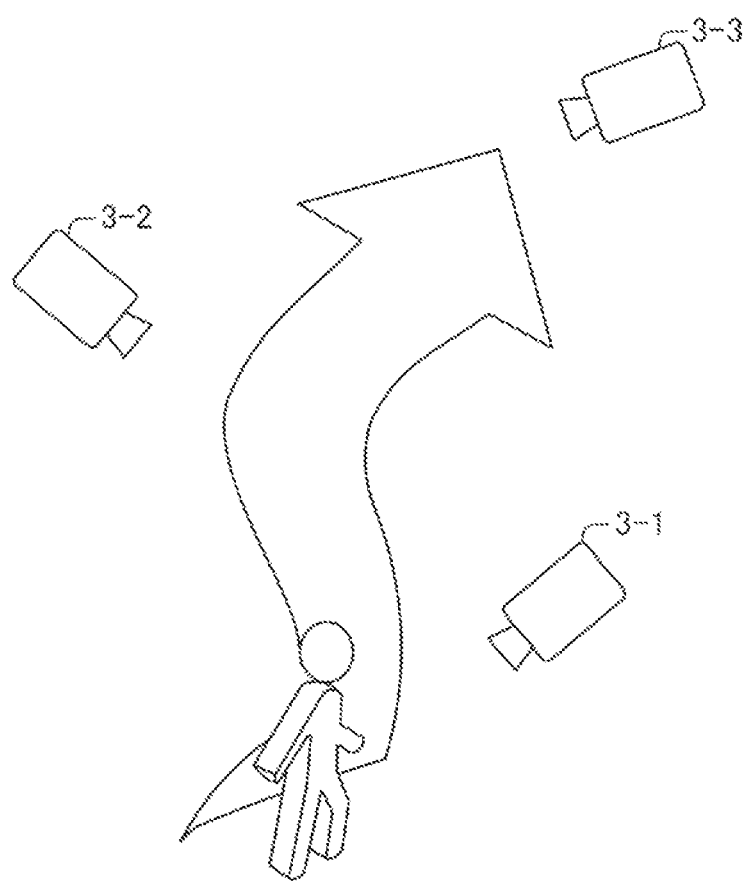
FIG. 5 is a view showing an example of a registration condition.
Figure 6:
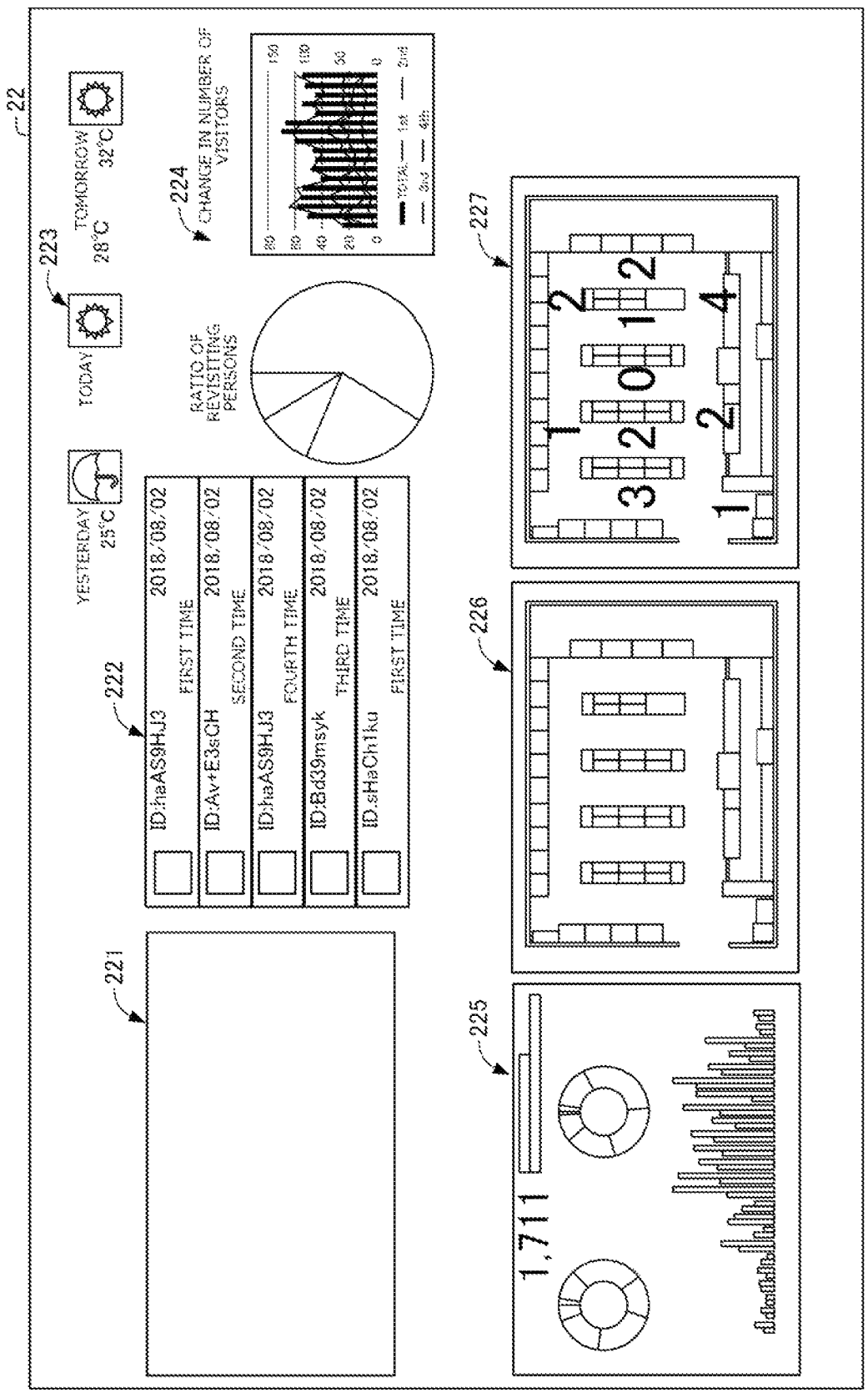
FIG. 6 is a view showing an example of an output by an output unit.
Figure 7:
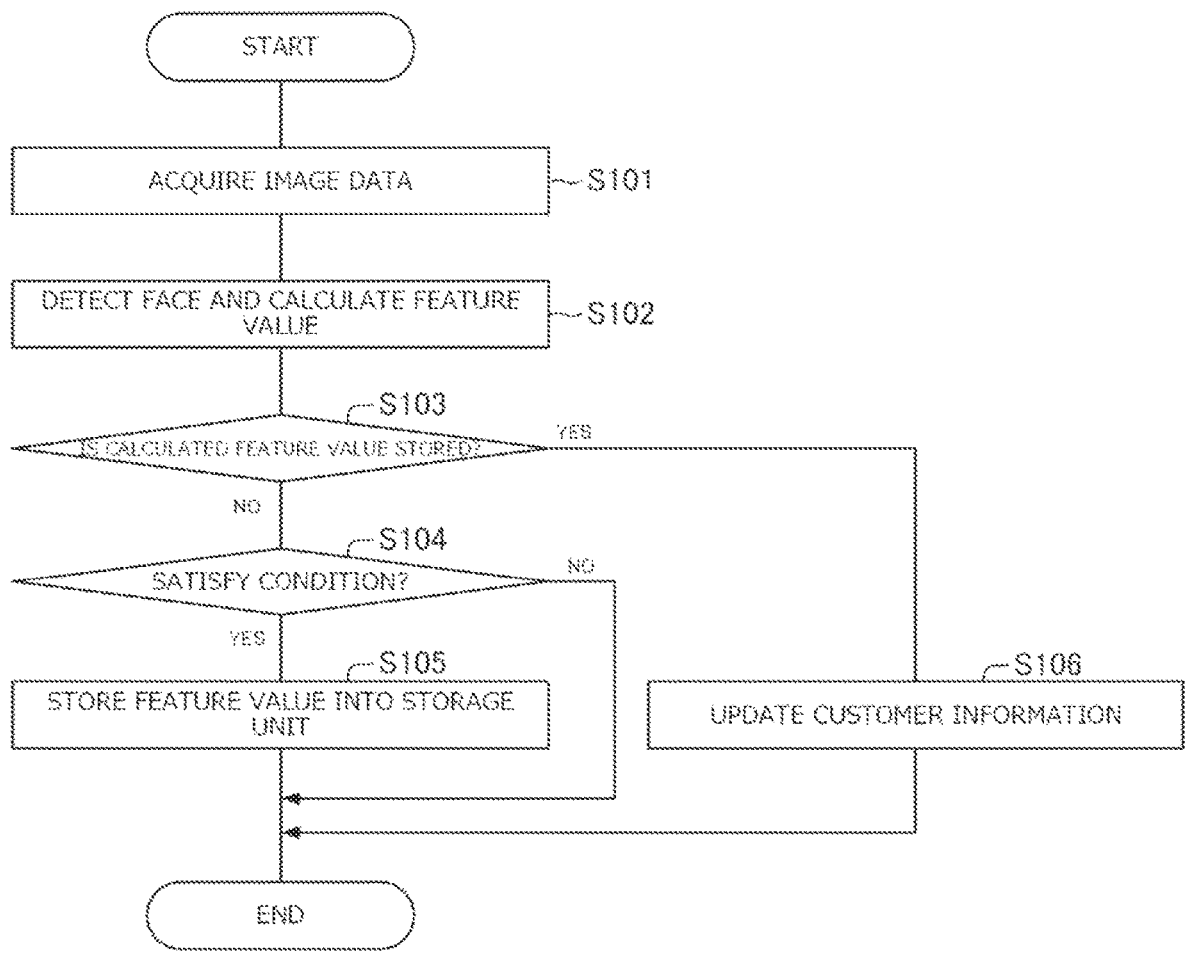
FIG. 7 is a flowchart showing an example of an operation of the customer information registration apparatus.

A first example embodiment of the present invention will be described with reference to FIGS. 1 to 7. FIG. 1 is a view showing an example of an entire configuration of a customer information registration system 1. FIG. 2 is a block diagram showing an example of a configuration of a customer information registration apparatus 2. FIG. 3 is a view showing an example of customer information 242. FIG. 4 is a view showing an example of determination condition information 243. FIG. 5 is a view showing an example of a registration condition. FIG. 6 is a view showing an example of an output by an output unit 257. FIG. 7 is a flowchart showing an example of an operation of the customer information registration apparatus 2.

In the first example embodiment of the present invention, the customer information registration system 1 having the customer information registration apparatus 2 will be described. The customer information registration apparatus 2 stores information including a feature value calculated from a face image of a customer, and so on, into a storage unit 24 as the customer information 242 for the purpose of utilizing for customer analysis such as repeater detection. As will be described later, the customer information registration apparatus 2 in this example embodiment matches face data of a customer against face data stored in the storage unit 24. Moreover, in a case where the matching fails (that is, in a case where acquired face data is not stored in the storage unit 24), the customer information registration apparatus 2 determines whether or not the behavior in a shop of the customer corresponding to the face data satisfies a given condition. Then, in a case where the behavior of the customer satisfies the given condition, the customer information registration apparatus 2 newly registers information including the face data of the customer as the customer information 242. Herein, face data refers to a feature value calculated from a face image or the face image. In the following description, a case of employing the feature value as face data will be described.

FIG. 1 shows an example of an entire configuration of the customer information registration system 1. Referring to FIG. 1, the customer information registration system 1 has, for example, the customer information registration apparatus 2, a camera 3, and a cash register 4.

As shown in FIG. 1, the customer information registration apparatus 2 and the camera 3 are connected so as to be able to communicate with each other. Moreover, the customer information registration apparatus 2 and the cash register 4 are connected so as to be able to communicate with each other.

The configuration of the customer information registration system 1 is not limited to the case shown in FIG. 1. For example, the number of the cameras 3 and the number of the cash registers 4 may be one, or may be two or more. Moreover, for example, the customer information registration system 1 may have every kind of sensor such as a weight sensor installed on a product shelf or at the entrance of a shop, a RFID (radio frequency identifier) reader, and so on. Moreover, for example, the customer information registration system 1 may have no cash register 4.

The customer information registration apparatus 2 is an information processing apparatus in which a feature value is stored. FIG. 2 shows an example of a configuration of the customer information registration apparatus 2. Referring to FIG. 2, the customer information registration apparatus 2 has, as major components, an operation input unit 21, a screen display unit 22, a communication IN unit 23, the storage unit 24, and an arithmetic logic unit 25.

The operation input unit 21 is formed by operation input devices such as a keyboard and a mouse. The operation input unit 21 detects an operation by an operator and outputs to the arithmetic logic unit 25.

The screen display unit 22 is formed by a screen display device such as an LCD (Liquid Crystal Display). The screen display unit 22 displays every kind of information on a screen in response to an instruction from the arithmetic logic unit 25. For example, the screen display unit 22 displays, on the screen, image data information 241, the customer information 242, information based on the result of determination by a condition determination unit 255 and so on in response to an instruction from the arithmetic logic unit 25.

The communication I/F unit 23 is formed by a data communication circuit, for example. The communication I/F unit 23 performs data communication with every kind of device connected via a communication line. For example, the customer information registration apparatus 2 performs communication with the camera 3, the cash register 4, and an external device such as a sensor via the communication I/F unit 23.

The storage unit 24 is a memory unit such as a hard disk or a memory. In the storage unit 24, processing information necessary for every kind of processing in the arithmetic logic unit 25 and a program 244 are stored. The program 244 is loaded to and executed by the arithmetic logic unit 25 and thereby realizes every kind of processing unit. The program 244 is previously loaded from an external device or a recording medium via a data input/output function such as the communication I/F unit 23 and stored in the storage unit 24. Major information stored in the storage unit 24 are the image data information 241, the customer information 242, and the determination condition information 243.

The image data information 241 is image data acquired from the camera 3 via the communication I/F unit 23. The image data information 241 is used by a feature value calculation unit 252 and an analysis unit 253, for example.

The customer information 242 indicates information about a customer visiting the inside of a shooting area or a monitored area of the camera 3 in a shop or the like. The customer information 242 includes at least face feature value information indicating a feature value calculated from a face image of the customer. The customer information 242 can also include attribute information indicating the age, gender and so on of the customer determined from the face image, past visit information indicating the number of visits and the last visit date, behavior-related information (behavior information) that is information related to the behavior of the customer in a shooting area or a monitored area of the camera 3 in the shop or the like, and so on.

FIG. 3 shows an example of the customer information 242. Referring to FIG. 3, in the customer information 242, for example, an ID, face feature value information, attribute information, the number of visits, a last visit date, and behavior-related information are associated with each other. For example, in the first row of FIG. 3, an ID "Av+E3sCH", face feature value information "xxxxxxxxxx", attribute information "aaaaa", the number of visits "2", a last visit date "2018/07/20", and behavior-related information "XXXXXX" are associated with each other. As a result of storing face feature value information and behavior-related information in association with each other, for example, a marketer can know the grounds for storing the face feature value information in the storage unit 24.

Herein, an ID is identification information for identifying a customer. For example, an ID is automatically assigned when new face feature value information is stored in the storage unit 24. Face feature value information is information indicating the feature value of a face image. Face feature value information is calculated by the feature value calculation unit 252 to be described later based on the face image (the image data information 241). Attribute information is information indicating the attributes of a customer, such as age and gender. For example, attribute information is determined by the analysis unit 253 based on the image data information 241 or the like. The number of visits indicates the number of visits of a customer up to the last time (or including the present), and a last visit date indicates the date of the last visit of the customer. Visit information such as the number of visits and a last visit date is updated by, for example, a matching unit 254 or the like. Behavior-related information is information related to the behavior of a customer in a shooting area or a monitored area of the camera 3 such as the inside of a shop. Behavior-related information can include, for example, information indicating the number of cameras having captured the corresponding customer during one visit, the stay time of the customer in the entire shop or in each area when the inside of the shop is divided into a plurality of areas in advance, the presence or absence of detection of reaching for a product, the presence or absence of purchase of a product, the flow line of the customer, the line of sight of the customer, and so on.

FIG. 3 shows an example of the customer information 242. The information included in the customer information 242 is not limited to those illustrated in FIG. 3. For example, the customer information 242 may be composed of part of the information illustrated in FIG. 3 including face feature value information; for example, may be composed of only face feature value information. Moreover, the customer information 242 may include information other than those illustrated in FIG. 3, such as information indicating the weather and time when the customer visits the shop, and a condition satisfied at the time of a last visit of the customer (a condition satisfied when it was determined to store face feature value information into the storage unit 24) among various conditions included in the determination condition information 243.

The determination condition information 243 is information indicating a condition used when the condition determination unit 255 determines whether or not to store a feature value calculated by the feature value calculation unit 252 in the storage unit 24 as the customer information 242.

The determination condition information 243 includes a condition according to a behavior of a customer in a shop. For example, the determination condition information 243 can include conditions such as "whether the feature value of the same person is calculated based on image data acquired from a predetermined given number (any number is acceptable) or more cameras", "whether the stay time (any time is acceptable) in the shop of the same person identified based on the feature value is equal or more than a given time", "whether reaching for a product is detected", "whether purchase of a product is detected based on an association with POS (Point of sale) information obtained from the cash register 4, or the like", "whether the stay time in a predetermined given area exceeds a predetermined threshold value based on tracking a flow line, or the like", and "whether the flow line of the person satisfies a given condition".

Thus, the determination condition information 243 includes various conditions according to the behavior of a customer in a shop. In other words, the determination condition information 243 includes a condition for determining whether or not it can be determined that a customer has an intention to purchase a product based on the behavior of the customer in the shop. Moreover, the determination condition information 243 includes a condition for determining whether or not it can be determined that a customer considers purchase of a product based on the behavior of the customer in the shop. By thus setting the determination condition information 243, for example, it is possible to suppress the storage of information of a person who is inappropriate to be treated as a repeater, such as a person who simply passes through in the shop, into the storage unit 24. That is to say, it is possible to register information of a customer who is appropriate for analysis such as repeater analysis.

The determination condition information 243 may include a condition other than the conditions illustrated above, such as "whether a weight change on a product shelf located in the vicinity of a customer is detected". In the case of the condition "whether a weight change on a product shelf located in the vicinity of a customer is detected", the condition determination unit 255 to be described later determines whether or not to store a feature value which is not included in the customer information 242 into the storage unit 24 based on a weight change when a customer picks up a product from a shelf equipped with a weight sensor.

Further, the determination condition information 243 may be information in which the abovementioned every kind of condition is associated with information indicating weight. FIG. 4 shows an example of the determination condition information 243 indicating the association between a condition and a weight. For example, in the first row of FIG. 4, a condition "calculate the feature value of the same person based on image data acquired from a predetermined number or more cameras" is associated with a weight "15". Moreover, in a case where the information indicating weight is included, the determination condition information 243 can include a weight threshold value that is a value to be compared with the total value of weights. The value of a weight associated with every kind of condition may be set to any value.

The arithmetic logic unit 25 has a microprocessor such as a MPU and a peripheral circuit thereof, loads the program 244 from the storage unit 24 and executes the program 244, and thereby makes the hardware and the program cooperate with each other and realizes various processing units. Major processing units realized by the arithmetic logic unit 25 are, for example, an image data acquisition unit 251, the feature value calculation unit 252, the analysis unit 253, the matching unit 254, the condition determination unit 255, a registration unit 256, and the output unit 257.

The image data acquisition unit 251 acquires image data from the camera 3 via the communication I/F unit 23. Then, the image data acquisition unit 251 stores the acquired image data into the storage unit 24 as the image data information 241.

In a case where the customer information registration system 1 has a plurality of cameras 3, the image data acquisition unit 251 acquires image data from each of the plurality of cameras 3. In such a case, for example, the image data acquisition unit 251 can associate identification information of the camera 3 with the image data and store the associated information into the storage unit 24. In other words, the image data acquisition unit 251 can store image data into the storage unit 24 in a way that it can be determined which camera 3 has acquired the image data.

The feature value calculation unit 252 calculates the feature value of a face image. For example, the feature value calculation unit 252 extracts a face image (a face region) that is a region indicating the face of a customer from the image data information 241. Then, the feature value calculation unit 252 calculates the feature value of the extracted face image.

In this example embodiment, a process when the feature value calculation unit 252 calculates the feature value of a face image is not limited specifically. For example, the feature value calculation unit 252 can calculate the feature value of a face image by a known method; for example, calculate the feature value based on the position of a facial feature point such as eye, nose, or edge of mouth detected from the face image. It is needless to say that the feature value calculation unit 252 may calculate the feature value by using another known method, for example, by using luminance information or using a value according to the relationship between local regions.

Further, as described above, in a case where the customer information registration apparatus 2 has a plurality of cameras 3, the image data acquisition unit 251 associates identification information of the camera 3 with the image data and stores the associated information into the storage unit 24, for example. Therefore, the feature value calculation unit 252 can, for example, associate the calculated feature value of the face image and the identification information of the corresponding camera 3. In other words, the feature value calculation unit 252 can calculate the feature value in a way that it can be determined which camera 3 has acquired image data which the feature value has been calculated based on.

The analysis unit 253 analyzes image data indicated by the image data information 241 and a face image extracted from the image data, and thereby acquires attribute information indicating the gender and age of a customer, and acquires behavior-related information (behavior information) such as the stay time of a customer in the shop or in each area, the presence or absence of reaching for a product, detection of the flow line, and detection of the line of sight of the customer. Moreover, the analysis unit 253 analyzes image data indicated by the image data information 241 and a face image extracted from the image data, and thereby acquires statistical information that does not identify an individual customer at a shooting location of the camera 3 in the shop or the like, such as attribute statistical information indicating the total value of ages or the ratio of genders of customers, heat map information indicating which area in the store customers stay in for a long time, and number-of-passing-persons information indicating the number of passing customers within a given time.

Thus, the analysis unit 253 can acquire attribute information and behavior-related information that are information for each customer and also acquire statistical information that does not identify an individual customer, based on the image data information 241. Moreover, the analysis unit 253 can acquire behavior-related information indicating whether a customer has purchased a product and what product the customer has purchased, for example, by associating the feature value of a face image with POS (Point of sale) information or the like acquired from the cash register 4. The processing by the analysis unit 253 may also be realized by using a known method such as estimation of gender and age based on a feature value. Therefore, a detailed description of the processing by the analysis unit 253 will be omitted.

The matching unit 254 confirms whether or not the feature value of a face image calculated by the feature value calculation unit 252 is already stored in the storage unit 24. For example, the matching unit 254 matches the feature value calculated by the feature value calculation unit 252 against a feature value (face feature value information) included in the customer information 242 stored in the storage unit 24, and thereby confirms whether or not the feature value of the face image calculated by the calculation unit 252 is already stored in the storage unit 24.

In a case where the calculated feature value is included in the customer information 242, the matching unit 254 determines that the feature value of the face image calculated by the feature value calculation unit 252 is already stored in the storage unit 24. In this case, the matching unit 254 can update the customer information 242. For example, the matching unit 254 can increase the number of visits corresponding to the matched feature value by 1 or update the last visit date in the customer information 242. An update unit may be provided, and the matching unit 254 may instruct the update unit to update. The matching unit 254 can also instruct the output unit 257 to output information indicating that a customer having a feature value stored in the storage unit 24 has visited the shop to the screen display unit 22 or the like.

On the other hand, in a case where the calculated feature value is not included in the customer information 242, the matching unit 254 notifies the condition determination unit 255 that the feature value is not included in the customer information 242 (that is, the feature value calculated by the feature value calculation unit 252 is not stored in the storage unit 24). In other words, when determining that the feature value is not included in the customer information 242, the matching unit 254 does not immediately store the feature value into the storage unit 24, but notifies the condition determination unit 255 to determine whether or not to store the feature value into the storage unit 24.

The condition determination unit 255 determines whether or not to store a feature value which is not included in the customer information 242 into the storage unit 24. For example, the condition determination unit 255 determines whether or not to store a feature value which is not included in the customer information 242 into the storage unit 24 based on whether or not it ca be determined that the behavior of a customer in the shop shows the presence of an intention to purchase a product. To be specific, for example, when receiving a notification from the matching unit 254 that the feature value is not included in the customer information 242, the condition determination unit 255 confirms the result of feature value calculation by the feature value calculation unit 252 and the result of analysis by the analysis unit 253, and also confirms the determination condition information 243. Then, the condition determination unit 255 determines whether or not to store the feature value which is not included in the customer information 242 into the storage unit 24 based on the behavior of the customer in the shop determined from the result of the feature value calculation by the feature value calculation unit 252, the behavior-related information (behavior information) acquired as a result of the analysis by the analysis unit 253, and so on, and based on a condition indicated by the determination condition information 243.

For example, the condition determination unit 255 determines whether or not to store the feature value into the storage unit 24 based on whether or not the behavior of the customer in the shop satisfies a condition indicated by the determination condition information 243. For example, FIG. 5 shows an example of the behavior of the customer in the shop. In FIG. 5, image data showing the same customer are acquired by three cameras 3 (camera 3-1, camera 3-2, camera 3-3), respectively. In such a state, it is assumed that a condition "feature values of the same person are calculated based on image data acquired from three or more cameras" is included in the determination condition information 243. In this case, since the same feature values are calculated based on the image data acquired from the three cameras, the condition determination unit 255 determines that the behavior of the customer in the shop satisfies the condition indicated by the determination condition information 243. As a result, the condition determination unit 255 determines to store the feature value into the storage unit 24. Then, the condition determination unit 255 notifies to the registration unit 256 that it determines to store the feature value into the storage unit 24.

Thus, the condition determination unit 255 determines to store a feature value into the storage unit 24 when the behavior of a customer in the shop satisfies a condition indicated by the determination condition information 243, such as "the feature values of the same person are calculated based on image data acquired from a predetermined given number or more cameras", "the stay time in the shop of the same person identified based on the feature value exceeds a predetermined threshold value", "reaching for a product is detected", or "purchase of a product is detected based on an association with POS (Point of sale) information acquired from the cash register 4, or the like". Then, the condition determination unit 255 notifies to the registration unit 256 that it determines to store the feature value into the storage unit 24. On the other hand, in a case where the behavior of the customer in the shop does not satisfy the condition indicated by the determination condition information 243, the condition determination unit 255 suspends notification of determination to store the feature value into the storage unit 24 to the registration unit 256.

Further, for example, the condition determination unit 255 can determine whether or not to store a feature value into the storage unit 24 based on whether or not a value calculated based on the behavior of a customer in the shop exceeds a predetermined weight threshold value. For example, in a case where "the feature values of the same person are calculated based on image data acquired from a predetermined given number of, that is, three or more cameras" and "the stay time in the shop of the same person identified based on the feature value exceeds a predetermined threshold value", the condition determination unit 255 obtains 15+10=25 (see FIG. 4). Thus, every time the behavior of a customer in the shop satisfies a given condition, the condition determination unit 255 adds a value associated with the condition. Then, in a case where the added value exceeds a predetermined weight threshold value, the condition determination unit 255 determines to store the feature value into the storage unit 24, and notifies to the registration unit 256 that it determines to store the feature value into the storage unit 24. On the other hand, in a case where the added value is equal to or less than the predetermined weight threshold value, the condition determination unit 255 suspends notification of determination to store the feature value into the storage unit 24 to the registration unit 256.

Thus, the condition determination unit 255 determines whether or not to store a feature value which is not included in the customer information 242 into the storage unit 24 based on the behavior of a customer in the shop.

The condition determination unit 255 may be configured to determine a condition at any timing. For example, the condition determination unit 255 may be configured to determine a condition every time the feature value calculation unit 252 calculates a feature value or the matching unit 254 performs matching, or may be configured to determine a condition at predetermined given intervals. Moreover, for example, with a camera provided at a cash register or the exit of a shop, the condition determination unit 255 can perform the determination at a timing when the checkout processing of a product by a cash register is completed or at a timing when a customer leaves the shop.

The registration unit 256 stores a feature value which the condition determination unit 255 determines to store into the storage unit 24, into the storage unit 24. For example, the registration unit 256 receives notification of determination to store a feature value into the storage unit 24 from the condition determination unit 255. Then, the registration unit 256 stores the feature value into the storage unit 24 as the customer information 242. At this time, the registration unit 256 stores the feature value as face feature value information, and also stores attribute information and so on in association with the face feature value information.

Thus, the registration unit 256 stores a feature value which the condition determination unit 255 determines to store into the storage unit 24, as the customer information 242 into the storage unit 24. Therefore, a feature value which the condition determination unit 255 does not determine to store into the storage unit 24 is not stored as the customer information 242 into the storage unit 24.

The registration unit 256 may be configured to store a feature value at any timing. For example, the registration unit 256 may be configured to store a feature value into the storage unit 24 without waiting when receiving the result of determination by the condition determination unit 255, or may be configured to store a feature value into the storage unit 24 at a given timing, for example, once a day as a batch.

The output unit 257 instructs the screen display unit 22 or another external device to perform given output based on an instruction from the matching unit 254, the result of processing by the registration unit 256, or the like.

For example, the output unit 257 instructs the screen display unit 22 or the like to output information indicating that a customer having a feature value stored in the storage unit 24 visits the shop in response to notification from the matching unit 254. Moreover, the output unit 257 can instruct the screen display unit 22 or the like to output information according to the result of registration by the registration unit 256 (for example, statistical information such as the number of registrations in one day and information relating to a person who registers). The instruction to output the information according to the result of registration by the output unit 257 may be output every time information is stored in the customer information 242, or may be output at given intervals, for example, once a day at given time.

Further, for example, as shown in FIG. 6, the output unit 257 may instruct the screen display unit 22 to output the customer information 242, and so on, together with image information 221 acquired by the camera 3, and weather information 223, and so on. FIG. 6 shows an example of the display of the screen display unit 22 that is output as a result of the instruction by the output unit 257. Referring to FIG. 6, in response to an instruction from the output unit 257, for example, the image information 221, visiting customer information 222, the weather information 223, number-of-visits statistical information 224, attribute statistical information 225, heat map information 226, number-of-passing-persons information 227, and so on, can be displayed on the screen display unit 22.

Herein, the image information 221 indicates image data acquired from the camera 3 (the image data information 241). The visiting customer information 222 indicates information of customers visiting the shop at present. The vising customer information 222 can include at least part of the customer information 242. The weather information 223 indicates weather. In the case illustrated in FIG. 6, the weather information 223 indicates the weather for three days of yesterday, today, and tomorrow. The number-of-visits statistical information 224 indicates information indicating how many times each of the customers currently in the shop has previously visited the shop. The attribute statistical information 225 is information indicating the number of the customers by age and gender. The heat map information 226 is information indicating which area in the shop the customers stay in for a long time. The number-of-passing-persons information 227 is information indicating the number of passing persons within a given time. The number-of-visits statistical information 224, the attribute statistical information 225, the heat map information 226, and the number-of-passing-persons information 227 are acquired as a result of analysis by the analysis unit 253, for example.

Thus, the output unit 257 can instruct the screen display unit 22 to output the customer information 242, and so on, together with image data acquired by the image data acquisition unit 251 and the result of analysis by the analysis unit 253. The output unit 257 may instruct the screen display unit 22 to output information other than the illustrated above.

The example of the configuration of the customer information registration apparatus 2 has been described above.

The camera 3 acquires image data. The camera 3 is, for example, installed in advance at a given position in the shop to monitor the inside of the shop. The camera 3 may be a known monitoring camera, or the like.

The cash register 4 manages sales information according to interactions with customers such as purchase of products. For example, the cash register 4 is equipped with a POS system. When a customer purchases a product, the cash register 4 can transmit information indicating that the customer has purchased the product to the customer information registration apparatus 2.

The example of the configuration of the customer information registration system 1 has been described above.

Next, an operation of the customer information registration apparatus 2 will be described. FIG. 7 is a flowchart showing an example of the operation of the customer information registration apparatus 2.

Referring to FIG. 7, the image data acquisition unit 251 acquires image data from the camera 3 via the communication IN unit 23 (step S101). Then, the image data acquisition unit 251 stores the acquired image data as the image data information 241 into the storage unit 24.

The feature value calculation unit 252 calculates the feature value of a face image (step S102). For example, the feature value calculation unit 252 extracts a face image (a face region) that is a region indicating the face of a customer from the image data information 241. Then, the feature value calculation unit 252 calculates the feature value of the extracted face image.

The matching unit 254 confirms whether or not the feature value of the face image calculated by the feature value calculation unit 252 is already stored in the storage unit 24 (step S103). In a case where the calculated feature value is stored in the storage unit 24 (step S103, YES), the matching unit 254 updates the customer information 242 (step S106). Moreover, the matching unit 254 can instruct the output unit 257 to output information indicating that a customer having a feature value stored in the storage unit 24 has visited the shop to the screen display unit 22 or the like. On the other hand, in a case where the calculated feature value is not stored in the storage unit 24 (step S103, NO), the matching unit 254 notifies the condition determination unit 255 that the feature value calculated by the feature value calculation unit 252 is not stored in the storage unit 24.

The condition determination unit 255 determines whether or not to store the feature value that is not included in the customer information 242 into the storage unit 24 based on the behavior of the customer in the shop (step S104). In a case where the behavior of the customer in the shop satisfies a given condition (for example, a condition indicated by the determination condition information 243) (step S104, YES), the condition determination unit 255 determines to store the feature value into the storage unit 24. Then, the condition determination unit 255 notifies the registration unit 256 that it determines to store the feature value into the storage unit 24. On the other hand, in a case where the behavior of the customer in the shop does not satisfy the given condition (step S104, NO), the condition determination unit 255 does not store the feature value into the storage unit 24.

The example of the operation of the customer information registration apparatus 2 has been described above.

Thus, the customer information registration apparatus 2 has the matching unit 254, the condition determination unit 255, and the registration unit 256. With such a configuration, the registration unit 256 can store only a feature value determined to satisfy a given condition by the condition determination unit 255 into the storage unit 24 among feature values determined not stored in the storage unit 24 by the matching unit 254. As a result, only a feature value of a face image with high usefulness can be stored into the storage unit 24. Consequently, for example, the accumulation of information with low usefulness and probability can be suppressed, and the bloat of data capacity can be suppressed. Moreover, repeater detection can be performed efficiently.

Further, the condition determination unit 255 is configured to be able to determine whether or not to store a feature value into the storage unit 24 based on a condition included in the determination condition information 243 in which various conditions according to the behaviors of customers in the shop are included. With such a configuration, for example, it becomes possible to suppress storage of information of a person who is not inappropriate to be treated as a repeater, such as a person simply passing through in the shop, into the storage unit 24.

In this example embodiment, a case of realizing the customer information registration apparatus 2 by one information processing apparatus has been described (see FIG. 2). However, the customer information registration apparatus 2 may be realized by a plurality of information processing apparatuses connected so as to be able to communicate via a network.

Further, in this example embodiment, the determination condition information 243 is previously stored in the storage unit 24. However, every kind of condition indicated by the determination condition information 243 may be, for example, a condition obtained as a result of learning by a machine learning unit.

Further, in this example embodiment, a case in which the camera 3 is provided outside the customer information registration apparatus 2 is illustrated. However, the customer information registration apparatus 2 may have a function as the camera 3. Moreover, the camera 3 may have a function as the customer information registration apparatus 2. That is to say, the camera 3 may be configured to have the respective functions described in this example embodiment.

Further, in this example embodiment, in a case where a calculated feature value is not stored in the storage unit 24, the matching unit 254 (or the update unit) updates the customer information 242. However, the matching unit 254 may be configured to update the customer information 242 after receiving the result of determination by the condition determination unit 255. That is to say, the condition determination unit 255 may be configured to perform determination of a condition regardless of the result of matching by the matching unit 254.

Further, the customer information registration system 1 described in this example embodiment can be utilized not only as a system for efficiently detecting a repeater, but also as a system for efficiently detecting a suspicious person such as a shoplifter to whom the shop should pay attention, for example. In this case, the customer information registration apparatus 2 may be configured to store the feature value of a face image into the storage unit 24 when it can be determined based on the behavior of a customer in the shop that the customer has no intention to purchase a product or the behavior of the customer is peculiar to a shoplifter.

Second Example Embodiment

Figure 8:
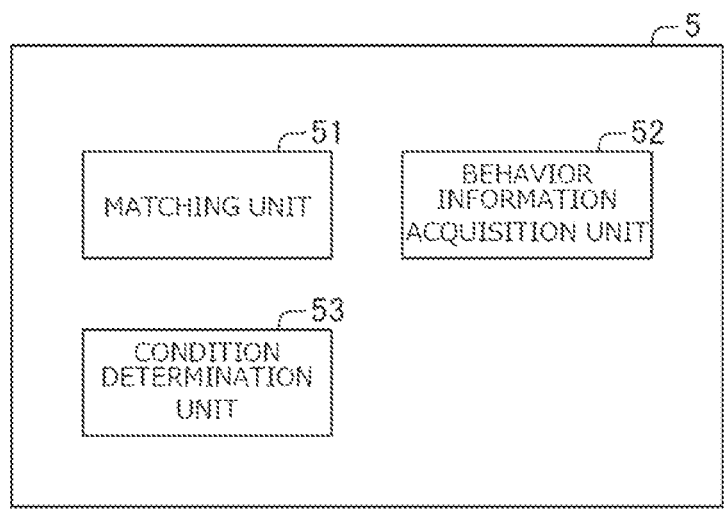
FIG. 8 is a block diagram showing an example of a configuration of a customer information registration apparatus in a second example embodiment of the present invention.

Next, with reference to FIGS. 8 and 9, a second example embodiment of the present invention will be described. In the second example embodiment, the overview of configurations of a customer information registration apparatus 5 and a customer information registration system 7 will be described.

First, with reference to FIG. 8, the customer information registration apparatus 5 will be described. FIG. 8 shows an example of the configuration of the customer information registration apparatus 5. Referring to FIG. 8, the customer information registration apparatus 5 has, for example, a matching unit 51, a behavior information acquisition unit 52, and a condition determination unit 53.

For example, the customer information registration apparatus 5 has an arithmetic logic unit such as a CPU (Central Processing Unit), and a memory unit in which a program is stored. The customer information registration apparatus 5 realizes the respective processing units mentioned above by execution of the program stored in the memory unit by the arithmetic logic unit.

The matching unit 51 matches face data of a customer based on image data acquired by a camera in a shop against face data stored in the memory unit.

The behavior information acquisition unit 52 acquires behavior information according to a behavior in the shop of a customer. For example, the behavior information acquisition unit 52 acquires behavior information based on image data acquired by the camera in the shop. The behavior information acquisition unit 52 may acquire behavior information by a method other than illustrated above.

In a case where the matching fails, the condition determination unit 53 determines whether or not to store the face data into the memory unit based on the behavior information acquired by the behavior information acquisition unit 52. Based on the result of the determination by the condition determination unit 52, the face data is stored into the memory unit.

Thus, the customer information registration apparatus 5 in this example embodiment has the matching unit 51, the behavior information acquisition unit 52, and the condition determination unit 53. With such a configuration, in a case where the matching by the matching unit 51 fails, the condition determination unit 53 can determine whether or not to store the face data into the memory unit based on the behavior information acquired by the behavior information acquisition unit 53. As a result, only face data with high usefulness can be stored into the memory unit. Consequently, for example, the accumulation of information with low usefulness and probability can be suppressed, and the bloat of data capacity can be suppressed. Moreover, repeater detection can be performed efficiently.

Further, the customer information registration apparatus 5 described above can be realized by installation of a given program into the customer information registration apparatus 5. To be specific, a program as another aspect of the present invention is a program for causing a customer information registration apparatus having a memory unit to realize: the matching unit 51 that matches face data of a customer based on image data acquired by a camera in a shop against face data stored in the memory unit; the behavior information acquisition unit 52 that acquires behavior information according to a behavior in the shop of the customer; and the condition determination unit 53 that, in a case where the matching fails, determines whether or not to store the face data into the memory unit based on the behavior information acquired by the behavior information acquisition unit 52.

Further, a customer information registration method executed by the customer information registration apparatus 5 described above is a method by which a customer information registration apparatus having a memory unit matches face data of a customer based on image data acquired by a camera in a shop against face data stored in the memory unit, acquires behavior information according a behavior in the shop of the customer and, in a case where the matching fails, determines whether or not to store the face data into the memory unit based on the acquired behavior information.

Further, every kind of function included by the customer information registration apparatus 5 described above may be included by a camera. To be specific, a camera as another aspect of the present invention is a camera which has: the matching unit 51 that matches face data of a customer based on acquired image data against face data stored in a memory unit; the behavior information acquisition unit 52 that acquires behavior information according to a behavior in a shop of the customer; and the condition determination unit 53 that, in a case where the matching fails, determines whether or not to store the face data into the memory unit based on the behavior information acquired by the behavior information acquisition unit 52.

Figure 9:
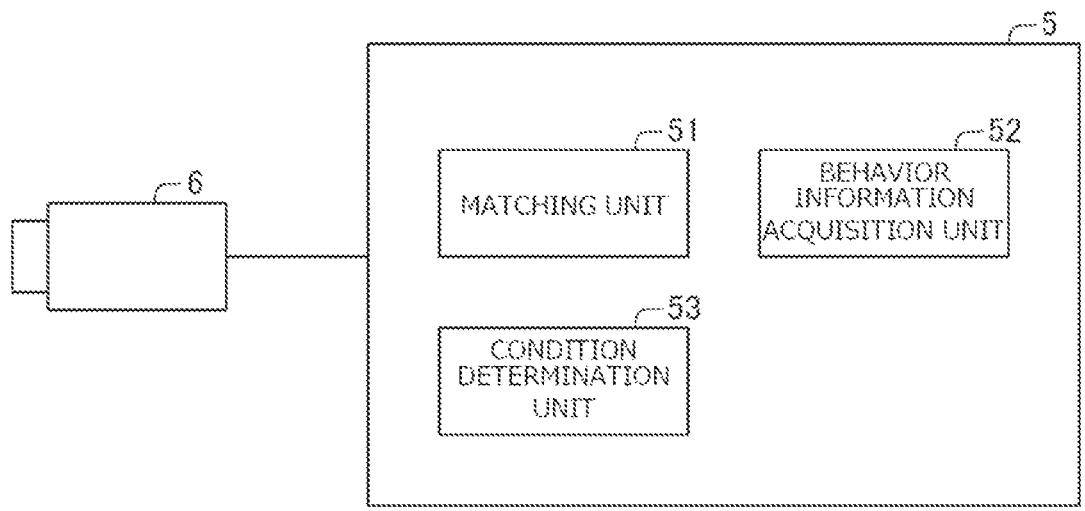
FIG. 9 is a block diagram showing an example of a configuration of a customer information registration system in the second example embodiment of the present invention.

Further, as shown in FIG. 9, the customer information registration system 7 may have a camera 6 that acquires image data and the customer information registration apparatus 5. In the case shown in FIG. 9, the camera 6 and the customer information registration apparatus 5 are connected so as to be able to communicate with each other. The configuration of the customer information registration apparatus 5 shown in FIG. 9 is the same as already described using FIG. 8. Therefore, a detailed description thereof will be omitted.

The inventions of the program, the customer information registration method, the camera, and the customer information registration system that have the configurations described above have the same effects and actions as the customer information registration apparatus 5, and therefore, can achieve the abovementioned object of the present invention. Moreover, a computer-readable recording medium on which the program is recorded also has the same effects and actions as the customer information registration apparatus 5, and therefore, can achieve the abovementioned object of the present invention.

<Supplementary Notes>

The whole or part of the example embodiments disclosed above can be described as the following supplementary notes. The overview of the customer information registration apparatus and so on according to the present invention will be described below. However, the present invention is not limited to the following configurations.

(Supplementary Note 1)

A customer information registration apparatus comprising:

a matching unit configured to match face data of a customer based on image data acquired by a camera in a shop against face data stored in a storage unit;

a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

(Supplementary Note 2)

The customer information registration apparatus according to Supplementary Note 1, wherein the condition determination unit is configured to determine whether or not to store the face data into the storage unit based on whether or not it is determined from the behavior information that the customer intends to purchase of a product or the customer has considered purchase of a product.

(Supplementary Note 3)

The customer information registration apparatus according to Supplementary Note 1 or 2, wherein the condition determination unit is configured to determine whether or not to store the face data into the storage unit based on whether or not the behavior of the customer indicated by the behavior information satisfies a predetermined determination condition.

(Supplementary Note 4)

The customer information registration apparatus according to Supplementary Note 3, wherein the condition determination unit is configured to, in a case where the behavior of the customer indicated by the behavior information satisfies the predetermined determination condition, determine to store the feature value into the storage unit.

(Supplementary Note 5)

The customer information registration apparatus according to Supplementary Note 1 or 2, wherein the condition determination unit is configured to determine whether or not to store the face data into the storage unit based on whether or not a value according to the behavior of the customer indicated by the behavior information exceeds a predetermined weight threshold value.

(Supplementary Note 6)

The customer information registration apparatus according to Supplementary Note 5, wherein the condition determination unit is configured to, in a case where the value according to the behavior of the customer indicated by the behavior information exceeds the weight threshold value, determine to store the face data into the storage unit.

(Supplementary Note 7)

The customer information registration apparatus according to any one of Supplementary Notes 1 to 6, wherein in the storage unit, the face data and the behavior information are stored in association with each other.

(Supplementary Note 8)

The customer information registration apparatus according to any one of Supplementary Notes 1 to 7, wherein:

in the storage unit, visit information is stored in association with the face data, the visit information including at least one of a number of visits of a customer and a date of a visit of a customer; and the matching unit is configured to, in a case where the matching succeeds, update the visit information.

(Supplementary Note 9)

The customer information registration apparatus according to any one of Supplementary Notes 1 to 8, comprising an output unit configured to perform predetermined output according to a result of the determination by the condition determination unit.

(Supplementary Note 10)

The customer information registration apparatus according to any one of Supplementary Notes 1 to 9, wherein the behavior information acquisition unit is configured to acquire the behavior information based on the image data acquired by the camera.

(Supplementary Note 11)

A customer information registration method executed by a customer information registration apparatus having a storage unit, the customer information registration method comprising:

matching face data of a customer based on image data acquired by a camera in a shop against face data stored in the storage unit;

acquiring behavior information according to a behavior of the customer in the shop; and in a case where the matching fails, determining whether or not to store the face data into the storage unit based on the acquired behavior information.

(Supplementary Note 12)

A non-transitory computer-readable recording medium having a program recorded thereon, the program comprising instructions for causing a customer information registration apparatus having a storage unit to realize:

a matching unit configured to match face data of a customer based on image data acquired by a camera in a shop against face data stored in the storage unit;

a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

(Supplementary Note 13)

A camera comprising:

a matching unit configured to match face data of a customer based on acquired image data against face data stored in a storage unit;

a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

(Supplementary Note 14)

A customer information registration system comprising a customer information registration apparatus and a camera, the customer information registration apparatus comprising:

a matching unit configured to match face data of a customer based on image data acquired by the camera against face data stored in a storage unit;

a behavior information acquisition unit configured to acquire behavior information according to a behavior of the customer in the shop; and a condition determination unit configured to, in a case where the matching fails, determine whether or not to store the face data into the storage unit based on the behavior information acquired by the behavior information acquisition unit.

The program described in the example embodiments and supplementary note is stored in a memory unit, or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

The present invention is based upon and claims the benefit of priority from Japanese patent application No. 2018-180212, filed on Sep. 26, 2018, the disclosure of which is incorporated herein in its entirety by reference.

DESCRIPTION OF NUMERALS 1 customer information registration system
2 customer information registration apparatus
21 operation input unit
22 screen display unit
221 image information
222 visiting customer information
223 weather information
224 number-of-visits statistical information
225 attribute statistical information
226 heat map information
227 number-of-passing-persons information
23 communication IN unit
24 storage unit
241 image data information
242 customer information
243 determination condition information
244 program
25 arithmetic logic unit
251 image data acquisition unit
252 feature value calculation unit
253 analysis unit
254 matching unit
255 condition determination unit
256 registration unit
257 output unit
3 camera
4 cash register
5 customer information registration apparatus
51 matching unit
52 behavior information acquisition unit
53 condition determination unit
6 camera
7 customer information registration system

What is claimed is:

1. A customer information registration apparatus comprising:

at least one memory configured to store instructions; and
at least one hardware processor configured to execute the instructions to:
acquire image data of a customer captured by one or more of a plurality of cameras in a shop;
count a number of the cameras that have captured the image data in which a face of the customer appears;
in response to the number of cameras being equal to or greater than a predetermined number, add a first weight to a total weight for the customer, the total weight corresponding to whether or not behavior of the customer in the shop indicates that the customer intends to purchase the product in the shop, wherein the predetermined number is no less than three;
detect whether the customer is reaching for the product in the shop, based on the image data;
in response to detecting that the customer is reaching for the product in the shop, add a second weight to the total weight corresponding to whether or not the behavior of the customer in the shop indicates that the customer intends to purchase the product in the shop;
track a flow line of the customer within the shop, based on the image data;
in response to the flow line of the customer satisfies a given condition, add a third weight to the total weight corresponding to whether or not the behavior of the customer in the shop indicates that the customer intends to purchase the product in the shop;
determine a stay time of the customer in a predetermined area of the shop based on the flow line tracked based on the image data;
in response to the stay time of the customer in the predetermined area being greater than predetermined threshold value, add a fourth weight to the total weight corresponding to whether or not the behavior of the customer in the shop indicates that the customer intends to purchase the product in the shop;
determine whether the total weight exceeds a threshold;
in response to determining that the total weight exceeds the threshold, determine that the customer intends to purchase the product in the shop;
in response to determining that the total weight does not exceed the threshold, determine that the customer does not intend to purchase the product in the shop;
calculate face data of the customer based on the image data;

determine that the calculated face data of a customer does not match stored face data stored in a storage device;

in response to the calculated face data not matching the stored face data, and in response to determining that the customer intends to purchase the product in the shop, store the calculated face data of the customer in the storage device; and in response to the calculated face data not matching the stored face data, and in response to determining that the customer does not intend to purchase the product in the shop, do not store the calculated face data of the customer in the storage device, wherein the calculated face data of the customer is stored in the storage device only when a determination has been made that the customer intends to purchase the product in the shop.

2. The customer information registration apparatus according to claim 1, wherein in the storage unit, the stored face data and behavior information of the customer are stored in association with each other in the storage device.

3. The customer information registration apparatus according to claim 1, wherein:

the stored face data and visit information are stored in association with each other in the storage device, the visit information including at least one of a number of visits of the customer and a date of each visit of the customer; and when the calculated face data matches the stored face data, the visit information is updated in the storage device.

4. The customer information registration apparatus according to claim 1, wherein the at least one hardware processor is configured to execute the instructions to perform a predetermined output according to a result of the determination.

5. The customer information registration apparatus according to claim 1, wherein the at least one hardware processor is configured to execute the instructions to acquire behavior information based on the image data captured by the plurality of cameras.

6. A customer information registration method comprising:

acquiring, by a processor, image data of a customer captured by one or more of a plurality of cameras in a shop;

counting, by the processor, a number of the cameras that have captured the image data in which a face of the customer appears;

in response to the number of cameras being equal to or greater than a predetermined number, adding, by the processor, a first weight to a total weight for the customer, the total weight corresponding to whether or not behavior of the customer in the shop indicates that the customer intends to purchase the product in the shop, wherein the predetermined number is no less than three;

detecting, by the processor, whether the customer is reaching for the product in the shop, based on the image data;

in response to detecting that the customer is reaching for the product in the shop, adding, by the processor, a second weight to the total weight corresponding to whether or not the behavior of the customer in the shop indicates that the customer intends to purchase the product in the shop;

tracking, by the processor, a flow line of the customer within the shop, based on the image data;

in response to the flow line of the customer satisfies a given condition, adding, by the processor, a third weight to the total weight corresponding to whether or not the behavior of the customer in the shop indicates that the customer intends to purchase the product in the shop;

determining, by the processor, a stay time of the customer in a predetermined area of the shop based on the flow line tracked based on the image data;

in response to the stay time of the customer in the predetermined area being greater than predetermined threshold value, adding, by the processor, a fourth weight to the total weight corresponding to whether or not the behavior of the customer in the shop indicates that the customer intends to purchase the product in the shop;

determining, by the processor, whether the total weight exceeds a threshold;

in response to determining that the total weight exceeds the threshold, determining, by the processor, that the customer intends to purchase the product in the shop;

in response to determining that the total weight does not exceed the threshold, determining, by the processor, that the customer does not intend to purchase the product in the shop;

calculating, by the processor, face data of the customer based on the image data;

determining, by the processor, that the calculated face data of a customer does not match stored face data stored in a storage device;

in response to the calculated face data not matching the stored face data, and in response to determining that the customer intends to purchase the product in the shop, storing, by the processor, the calculated face data of the customer in the storage device; and in response to the calculated face data not matching the stored face data, and in response to determining that the customer does not intend to purchase the product in the shop, not storing, by the processor, the calculated face data of the customer in the storage device, wherein the calculated face data of the customer is stored in the storage device only when a determination has been made that the customer intends to purchase the product in the shop.

7. A non-transitory computer-readable recording medium storing a program executable by a customer information registration apparatus to perform processing comprising:

acquiring image data of a customer captured by one or more of a plurality of cameras in a shop;

counting a number of the cameras that have captured the image data in which a face of the customer appears;

in response to the number of cameras being equal to or greater than a predetermined number, adding a first weight to a total weight for the customer, the total weight corresponding to whether or not behavior of the customer in the shop indicates that the customer intends to purchase the product in the shop, wherein the predetermined number is no less than three;

detecting whether the customer is reaching for the product in the shop, based on the image data;

in response to detecting that the customer is reaching for the product in the shop, adding a second weight to the total weight corresponding to whether or not the behavior of the customer in the shop indicates that the customer intends to purchase the product in the shop;

tracking a flow line of the customer within the shop, based on the image data;

in response to the flow line of the customer satisfies a given condition, adding a third weight to the total weight corresponding to whether or not the behavior of the customer in the shop indicates that the customer intends to purchase the product in the shop;

determining a stay time of the customer in a predetermined area of the shop based on the flow line tracked based on the image data;

in response to the stay time of the customer in the predetermined area being greater than predetermined threshold value, adding a fourth weight to the total weight corresponding to whether or not the behavior of the customer in the shop indicates that the customer intends to purchase the product in the shop;

determining whether the total weight exceeds a threshold;

in response to determining that the total weight exceeds the threshold, determining that the customer intends to purchase the product in the shop;

in response to determining that the total weight does not exceed the threshold, determining that the customer does not intend to purchase the product in the shop;

calculating face data of the customer based on the image data;

determining that the calculated face data of a customer does not match stored face data stored in a storage device;

in response to the calculated face data not matching the stored face data, and in response to determining that the customer intends to purchase the product in the shop, storing the calculated face data of the customer in the storage device; and in response to the calculated face data not matching the stored face data, and in response to determining that the customer does not intend to purchase the product in the shop, not storing the calculated face data of the customer in the storage device, wherein the calculated face data of the customer is stored in the storage device only when a determination has been made that the customer intends to purchase the product in the shop.

\* \* \* \* \*